United States Patent
Sato

(10) Patent No.: US 8,985,166 B2
(45) Date of Patent: Mar. 24, 2015

(54) PNEUMATIC TIRE

(71) Applicant: Toyo Tire & Rubber Co., Ltd., Osaka-shi, Osaka (JP)

(72) Inventor: Yoshiki Sato, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 64 days.

(21) Appl. No.: 13/784,298

(22) Filed: Mar. 4, 2013

(65) Prior Publication Data

US 2013/0228255 A1 Sep. 5, 2013

(30) Foreign Application Priority Data

Mar. 2, 2012 (JP) .................................. 2012-047112

(51) Int. Cl.
*B60C 11/24* (2006.01)
*B60C 11/13* (2006.01)

(52) U.S. Cl.
CPC .......... B60C 11/24 (2013.01); *B60C 2011/1361* (2013.04); *B60C 11/1369* (2013.04)
USPC ............... 152/154.2; 152/209.19; 152/209.22

(58) Field of Classification Search
CPC .... B60C 11/24; B60C 11/1353; B60C 11/13; B60C 11/047; B60C 2011/1361; B60C 2011/0341; B60C 11/1369
USPC ................. 152/154.2, 209.1, 209.19, 209.22; D12/900, 901

See application file for complete search history.

(56) References Cited

U.S. PATENT DOCUMENTS

| 2,706,509 A * | 4/1955 | White ...................... 152/209.21 |
| 5,549,146 A * | 8/1996 | Trabandt et al. ............ 152/154.2 |
| 6,523,586 B1* | 2/2003 | Eromaki et al. ............ 152/154.2 |
| 8,162,014 B2* | 4/2012 | Mo ko et al. ............... 152/154.2 |
| 2011/0079333 A1* | 4/2011 | Collette et al. ............. 152/154.2 |
| 2014/0124108 A1* | 5/2014 | Paturle ....................... 152/154.2 |

FOREIGN PATENT DOCUMENTS

| DE | 102008021497 A1 | 11/2009 |
| DE | 102008024075 A1 | 11/2009 |
| FR | 2976522 | * 12/2012 |
| JP | 61-202902 A | 9/1986 |
| JP | 05-178021 A | 7/1993 |
| JP | 2002-225514 A | 8/2002 |
| JP | 2010-234559 A | 10/2010 |
| JP | 2012035686 A | 2/2012 |
| WO | WO 2010/102683 | * 9/2010 |

\* cited by examiner

*Primary Examiner* — Eric Hug
(74) *Attorney, Agent, or Firm* — Westerman, Hattori, Daniels & Adrian, LLP

(57) ABSTRACT

Bare can be prevented from occurring in a wear indicator. A pneumatic tire has a wear indicator 5 at the groove bottom of a main groove 2 formed in a tread surface 1 and extending in the circumferential direction. The wear indicator 5 is formed in the surface thereof with at least one recess 6.

7 Claims, 5 Drawing Sheets

PNEUMATIC TIRE

BACKGROUND OF THE INVENTION

1. Field of the Invention

The present invention relates to a pneumatic tire. More specifically, the present invention relates to a pneumatic tire having a wear indicator at the groove bottom of a main groove.

2. Description of Related Art

Conventionally, it is known a pneumatic tire formed with a wear indicator at the groove bottom of a main groove of a tread, wherein on at least one of main groove walls on both sides in the groove width direction of the wear indicator, at least one projection is provided which forms a recess opened into a tread surface (for instance, see JP 2010-234559 A).

It is known another pneumatic tire formed with a wear indicator at the groove bottom of a main groove of a tread, wherein recesses are provided in the front and rear groove bottoms in the tire circumferential direction of the wear indicator or in the left and right groove walls of the wear indicator (for instance, see JP 2002-22514 A).

It is known a further pneumatic tire formed with a wear indicator at the groove bottom of a main groove of a tread, wherein small slots are formed on both sides of the wear indicator (for instance, see JP 5-178021 A).

However, in the pneumatic tire described in JP 2010-234559 A, the appearance is deteriorated since the recess is required to be opened into the tread surface.

In addition, in the pneumatic tire described in JP 2002-22514 A, cracks are likely to be caused from the recesses formed in the main groove.

Further, in the pneumatic tire described in JP 5-178021 A, due to the large occupied volume of the wear indicator, bare (surface exposition of the unvulcanized rubber material caused by rubber flow failure) occurs at the time of vulcanization, which can deteriorate the appearance.

SUMMARY OF THE INVENTION

An object of the present invention is to provide a pneumatic tire which has the function of capable of preventing bare from occurring in a wear indicator without deteriorating the appearance and causing any cracks.

To solve the problems, the present invention provides a pneumatic tire having a wear indicator at the groove bottom of a main groove formed in a tread surface and extending in the circumferential direction, the wear indicator being formed in the surface thereof with at least one recess.

With the configuration, the occupied volume of the wear indicator becomes smaller by the formed recess, thereby reducing the rubber material to be used for this portion. Because of the smaller volume, rubber flow failure is less likely to be caused at the time of vulcanization, thereby preventing bare from occurring.

The wear indicator is preferably lattice-shaped by forming a plurality of recesses.

With the configuration, bare is less likely to occur, so that the appearance can be excellent.

The occupied volume of the recesses in the wear indicator may be 10% to 50% of the volume of the wear indicator with no recesses.

With the configuration, the wear indicator can be maintained at appropriate strength while bare can be prevented from occurring.

In the case where a plurality of recesses is formed in the wear indicator, the depth of each of the recesses may be changed.

The recesses formed in the wear indicator are preferably deeper in the center region thereof than in the peripheral region thereof.

In the case where a plurality of recesses is formed in the wear indicator, the recesses are preferably larger in the center region thereof than in the peripheral region thereof.

With the configurations, the region in which bare is most likely to occur is formed with the recesses having a large occupied volume. Bare can thus be further prevented from occurring.

According to the present invention, the at least one recess is formed in the wear indicator, so that rubber flow failure is less likely to be caused at the time of vulcanization. Bare can thus be prevented from occurring without deteriorating the appearance and causing any cracks.

DETAILED DESCRIPTION OF THE PREFERRED EMBODIMENT

Hereinafter, an embodiment according to the present invention will be described with reference to the accompanying drawings. In the following description, terms indicating specific directions and positions (e.g., terms including "up", "down", "side", and "end") are used, if necessary. Those terms are used for easily understanding the present invention with reference to the drawings, the meanings thereof not limiting the technical scope of the present invention. In addition, the following description is essentially exemplary only, and is not intended to limit the present invention, the objects to which the present invention is applied, and the use thereof.

Figure 1:
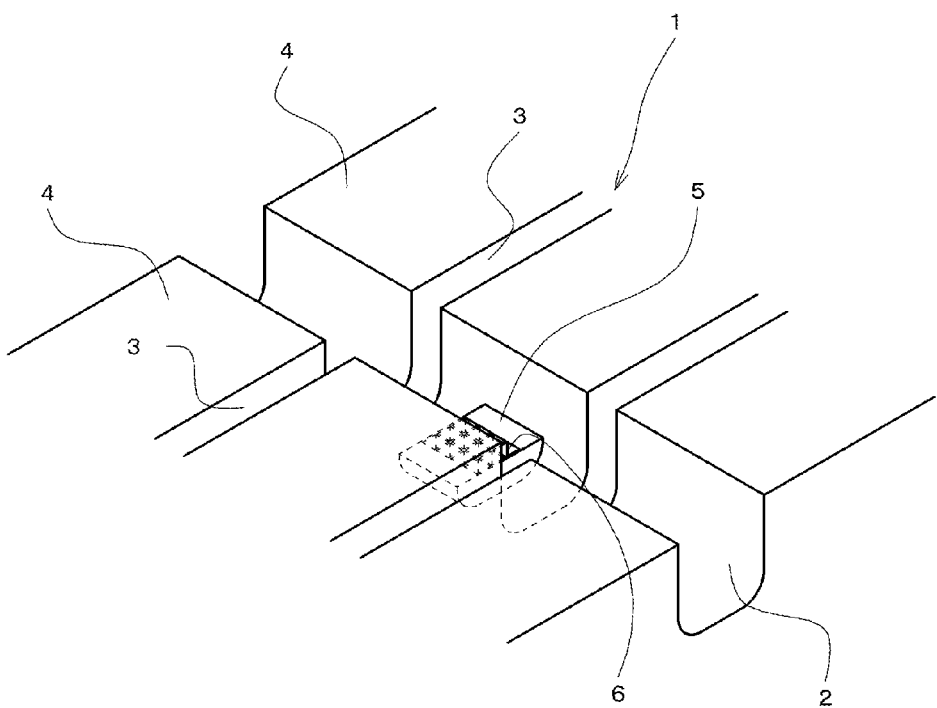
FIG. 1 is a partially perspective view including a wear indicator on a tread surface of a pneumatic tire according to this embodiment.
Figure 2A:
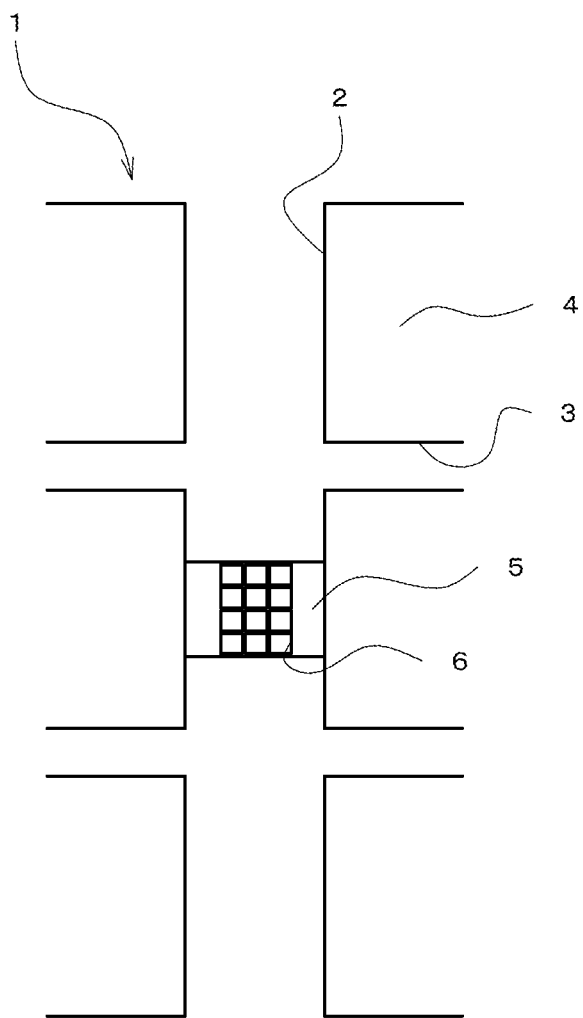
FIG. 2A is a plan view of FIG. 1.
Figure 2B:
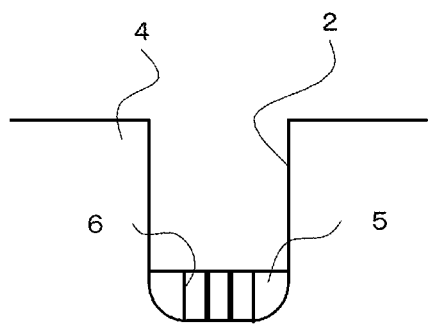
FIG. 2B is a cross-sectional view thereof.
Figure 3:
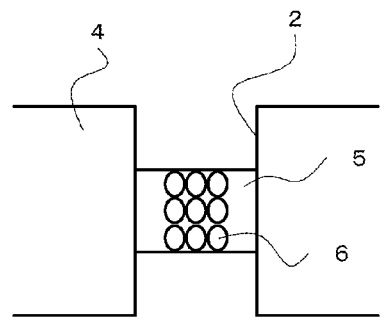
FIG. 3 is a plan view showing part of a tread surface including a wear indicator according to another embodiment.

FIGS. 1 to 3 show part of a tread surface 1 of a pneumatic tire according to this embodiment. The tread surface 1 is formed with a main groove 2 extending in the circumferential direction. The tread surface 1 is also formed with a sub-groove 3 crossing the main groove 2. The main groove 2 and the sub-groove 3 form a plurality of blocks 4.

The main groove 2 is formed at its groove bottom with a wear indicator 5 (TWI), the wear indicator 5 projecting from the groove bottom in the outside diameter direction. The wear indicator 5 indicates the wear limit of the tread surface 1. Here, three wear indicators 5 are provided at regular intervals in the circumferential direction for one main groove 2. Each of the wear indicators 5 is connected to groove walls formed by the blocks 4 opposite on both sides, and is formed in its upper surface with a plurality of recesses 6. The volume of the recesses 6 is 10% to 50% of the volume of the entire wear indicator formed with no recesses 6. At less than 10%, bare can occur in the wear indicator 5 at the time of vulcanization. At more than 50%, the strength can be insufficient.

For instance, the following forming patterns of the recesses 6 are given.

In FIG. 2A, a total of twelve recesses 6 of rectangular shape in plan view are formed such that three are in the width direction of the tread surface 1 and four are in the circumferential direction of the tread surface 1. The bottom surfaces of the recesses 6 are flush with the groove bottom of the main groove 2. The total volume of the recesses 6 is 48 mm³, and is 34% of the volume of the entire wear indicator.

In FIG. 3, the recesses 6 are formed in an elliptical shape in plan view (or may be formed in a circular shape in plan view). The depth of the recesses 6 is the same as shown in FIG. 2B. A total of nine recesses 6 are provided such that three are in the width direction of the tread surface 1 and three are in the circumferential direction of the tread surface 1. The total volume of the recesses 6 is 29 mm³, and is 21% of the volume of the entire wear indicator.

Figure 4A:
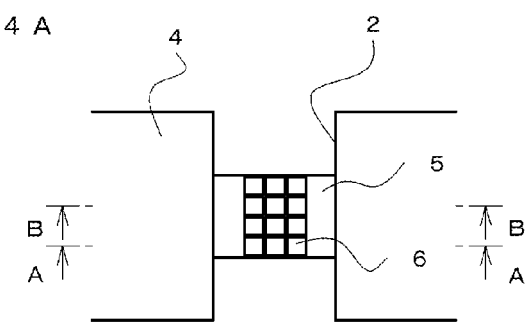
FIG. 4A is a plan view showing part of a tread surface including a wear indicator according to a further embodiment.
Figure 4B:
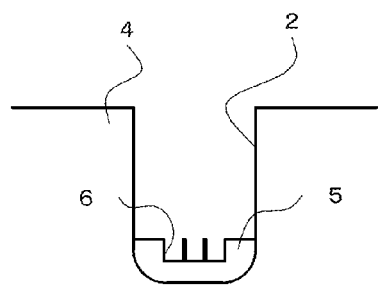
FIG. 4B is a cross-sectional view taken along line A-A.

In FIG. 4A, the rectangular shape in plan view of the recesses 6 is the same as shown in FIG. 2A. Two center recesses 6 and ten peripheral recesses 6 have different depths. The bottom surfaces of the two center recesses 6 are flush with the groove bottom of the main groove 2. The depth of the ten peripheral recesses 6 is about half of the depth of the two center recesses 6. The total volume of the recesses 6 is 28 mm³, and is 20% of the volume of the entire wear indicator.

Figure 5:
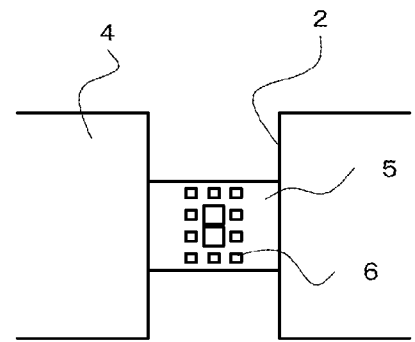
FIG. 5 is a plan view showing part of a tread surface including a wear indicator according to a still further embodiment.

In FIG. 5, a total of twelve recesses 6 of rectangular shape in plan view are formed such that three are in the width direction of the tread surface 1 and four are in the circumferential direction of the tread surface 1. The depth of the recesses 6 and the area in plan view of the two center recesses 6 are the same as shown in FIGS. 2A and 2B. The area of the ten peripheral recesses 6 is smaller than the area of the two center recesses 6. The total volume of the recesses 6 is 21.3 mm³, and is 15% of the volume of the entire wear indicator.

Figure 6:
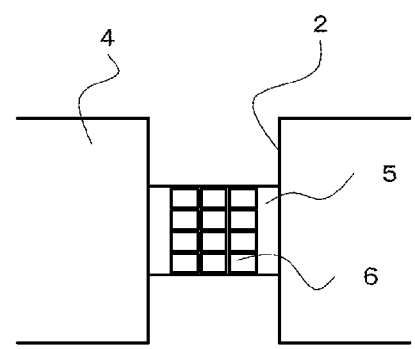
FIG. 6 is a plan view showing part of a tread surface including a wear indicator according to a still another embodiment.

In FIG. 6, a total of twelve recesses 6 of rectangular shape in plan view are formed such that three are in the width direction of the tread surface 1 and four are in the circumferential direction of the tread surface 1. The depth of the recesses 6 is the same as shown in FIG. 2B. The opening area in plan view is larger than shown in FIG. 2A. The total volume of the recesses 6 is 77 mm³, and is 55% of the volume of the entire wear indicator.

Figure 7:
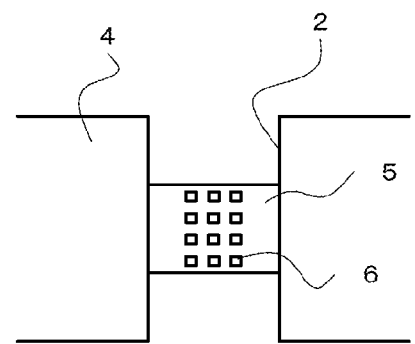
FIG. 7 is a plan view showing part of a tread surface including a wear indicator according to an even further embodiment.

In FIG. 7, a total of twelve recesses 6 of rectangular shape in plan view are formed such that three are in the width direction of the tread surface 1 and four are in the circumferential direction of the tread surface 1. The depth of the recesses 6 is the same as shown in FIG. 2B. The opening area in plan view is smaller than that shown in FIG. 2A. The total volume of the recesses 6 is 11 mm³, and is 8% of the volume of the entire wear indicator.

EXAMPLES

Figure 8:
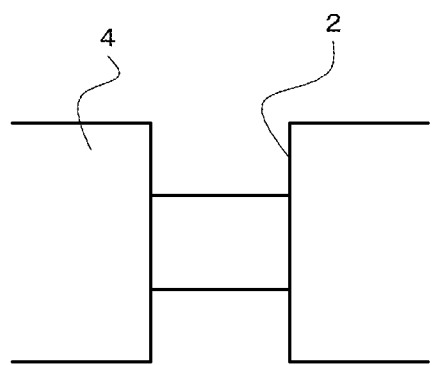
FIG. 8 is a plan view showing part of a tread surface including a wear indicator according to a conventional example.
Figure 9:
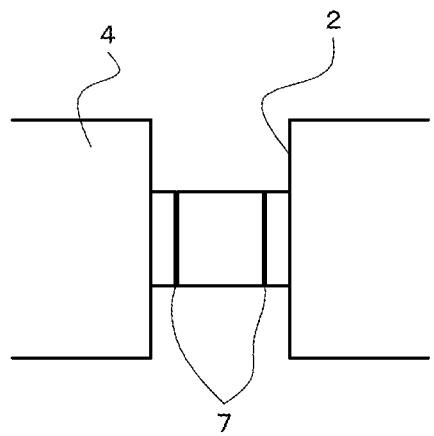
FIG. 9 is a plan view showing part of a tread surface including a wear indicator according to a conventional example.

In Table 1, percent defective (bare occurrence rate), visibility, and durability in Examples 1 to 6 of FIGS. 2A to 7 are compared with Comparative Examples 1 and 2. As shown in FIG. 8, in Comparative Example 1, no recesses 6 are formed in the wear indicator 5. As shown in FIG. 9, in Comparative Example 2, two grooves 7 extending in the circumferential direction are formed on both sides (both groove walls of the main groove 2). The total volume of the grooves 7 in this case is 7 mm³, and is 2% of the volume of the entire wear indicator.

One hundred sample tires having the wear indicator 5 of each of Examples 1 to 6 and Comparative Examples 1 and 2 are vulcanized. The percent defective (bare occurrence index) indicates in what percent of the vulcanized tires bare occurs. With the index of the pneumatic tires of Comparative Example 1 being 100, the visibility indicates the index of the pneumatic tires of each of Examples 1 to 6 and Comparative Example 2. As the index increases from 100, the visibility is more excellent. In the appearance after driving a distance (40,000 km) at the end of wear of the pneumatic tires, with the index of the pneumatic tires of Comparative Example 1 being 100, the durability indicates the index of the pneumatic tires of each of Examples 1 to 6 and Comparative Example 2. As the index decreases from 100, the durability is more deteriorative.

TABLE 1

| | | Comparative Example 1 | Comparative Example 2 | Example 1 | Example 2 | Example 3 | Example 4 | Example 5 | Example 6 |
|---|---|---|---|---|---|---|---|---|---|
| TWI | Volume (mm³) | 140.8 | 140.8 | 140.8 | 140.8 | 140.8 | 140.8 | 140.8 | 140.8 |
| Recesses | Volume (mm³) | — | 10.2 | 48 | 29 | 28 | 21.3 | 77 | 11 |
| Volume of recesses/volume of TWI | (%) | — | 7 | 34 | 21 | 20 | 15 | 55 | 8 |
| No. of recesses | Quantity | — | 2 | 12 | 9 | 12 | 12 | 12 | 12 |
| Shape of recesses | — | — | Groove-shaped on both sides | Square (same depth) (3 × 4) | Circular (same depth) (3 × 3) | Square (different depths) (3 × 4) | Square (different areas) (3 × 4) | Square (large area) (3 × 4) | Square (small area) (3 × 4) |
| Percent defective (bare occurrence index) | (%) | 5 | 10 | 1 | 1 | 1 | 1 | 1 | 3 |
| Visibility | | 100 | 101 | 105 | 105 | 104 | 104 | 105 | 102 |
| Durability | | 100 | 100 | 100 | 100 | 100 | 100 | 95 | 100 |

As is apparent from Table 1, in Examples 1 to 5, the bare occurrence index can be significantly improved, and in Example 6, there is a sufficient effect. In addition, in all of Examples 1 to 6, the visibility can be improved. Further, except for Example 5, the durability is not deteriorated. From these results, Examples 1 and 2 are particularly preferable.

The present invention is not limited to the configurations described in the embodiment, and various modifications can be made.

In the embodiment, the pneumatic tire having the sub-groove 3 has been described. However, even the pneumatic tire having only the main groove 2 can adopt the configurations of the wear indicator 5.

In the embodiment, the recesses 6 are formed to be lattice-shaped in the surface of the wear indicator 5. Without being limited to this, the recesses 6 can also be formed in a staggered, radial pattern or the like. Of course, the recesses 6 can also be randomly formed, and the number of recesses 6 is not limited. In other words, at least one recess 6 should be formed in the surface of the wear indicator 5. This can exhibit the effects in the percent defective (bare occurrence rate) and the visibility. However, from the viewpoint of the visibility and the durability, the recesses 6 are preferably formed to be point symmetrical or line symmetrical.

Figure 4C:
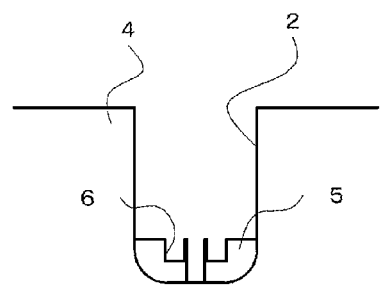
FIG. 4C is a cross-sectional view taken along line B-B.

In the embodiment, as shown in FIG. 4C, only the two center recesses 6 are deeply formed. However, the deep recesses 6 can be freely positioned. In addition, the recesses 6 have two depths, but may have multiple depths. However, the layout of the recesses 6 is preferably balanced, seen from the entire wear indicator 5.

What is claimed is:

1. A pneumatic tire comprising:
   a main groove formed in a circumferential direction of a tread surface of said pneumatic tire;
   a wear indicator extending in the tire circumferential direction and projecting outward from a bottom portion of the main groove,
   wherein the wear indicator is lattice-shaped by forming a plurality of recesses.

2. The pneumatic tire according to claim 1, wherein the occupied volume of the recesses in the wear indicator is 10% to 50% of the volume of the wear indicator formed with no recesses.

3. The pneumatic tire according to claim 1, wherein in the case where a plurality of recesses is formed in the wear indicator, the depth of each of the recesses is changed.

4. The pneumatic tire according to claim 3, wherein the recesses formed in the wear indicator are deeper in the center region thereof than in the peripheral region thereof.

5. The pneumatic tire according to claim 1, wherein in the case where a plurality of recesses is formed in the wear indicator, the recesses are larger in the center region thereof than in the peripheral region thereof.

6. A pneumatic tire comprising:
   a main groove formed in a tire circumferential direction of a tread surface of said pneumatic tire;
   a wear indicator extending in the tire circumferential direction and projecting outward from a bottom portion of the main groove,
   wherein an occupied volume of recesses in the wear indicator is 10% to 50% of a volume of the wear indicator formed with no recesses.

7. A pneumatic tire comprising:
   a main groove formed in a circumferential direction of a tread surface of said pneumatic tire;
   a wear indicator extending in the tire circumferential direction and projecting outward from a bottom portion of the main groove,
   wherein recesses formed in the wear indicator are deeper in a center region thereof than in a peripheral region thereof.

\* \* \* \* \*